United States Patent
Tuunanen

(12) 
(10) Patent No.: US 6,487,288 B1
(45) Date of Patent: Nov. 26, 2002

(54) INTELLIGENT NETWORK SWITCHING POINT AND CONTROL POINT

(75) Inventor: Heikki Tuunanen, Espoo (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/331,520
(22) PCT Filed: Oct. 23, 1998
(86) PCT No.: PCT/FI98/00829
§ 371 (c)(1), (2), (4) Date: Jun. 22, 1999
(87) PCT Pub. No.: WO99/22528
PCT Pub. Date: May 6, 1999

(30) Foreign Application Priority Data

Oct. 24, 1997 (FI) .................................................. 974053

(51) Int. Cl.⁷ .............................................. H04M 7/00
(52) U.S. Cl. .................................. 379/230; 379/221.08
(58) Field of Search .................................. 379/230, 229, 379/219, 220.01, 221.08–221.12, 207.02, 207.07, 279, 9.01, 32.03

(56) References Cited

U.S. PATENT DOCUMENTS

| | | | |
|---|---|---|---|
| 5,553,130 A | | 9/1996 | Turner .................... 379/220.01 |
| 5,896,441 A | * | 4/1999 | Akazawa et al. ........... 379/134 |

FOREIGN PATENT DOCUMENTS

| | | |
|---|---|---|
| EP | 0 581 526 | 2/1994 |
| EP | 0 886 446 | 12/1998 |
| GB | 2 315 638 | 2/1998 |
| WO | WO 95/23483 | 8/1995 |
| WO | WO 98/21901 | 5/1998 |

OTHER PUBLICATIONS

Copy of International Search Report for PCT/FI98/00829.
*Intelligent Network User's Guide for Capability Set I, Recommendation Q.1219*, pp. 1–78, Apr. 1994.
International Telecommunication Union, Recommendation Q.1214, "Intelligent Network—Distributed Functional Plane for Intelligent Network CS–1", pp. 1–63, Oct. 1995.
European Telecommunication Standard, "Intelligent Network (IN); Intelligent Network Capability Set 1 (CS1) Core Intelligent Network Application Protocol (INAP) Part 1: Protocol Specification", pp. 1–113, Jul. 1994.

\* cited by examiner

Primary Examiner—Ahmad F. Matar
Assistant Examiner—Benny Q. Tieu
(74) Attorney, Agent, or Firm—Altera Law Group, LLC

(57) ABSTRACT

An arrangement for transmitting data in a telecommunications system utilizing an intelligent network and comprising at least one intelligent network service control point for providing intelligent network services and at least one intelligent network service switching point for providing a connection between the telecommunications system and the intelligent network services. In order to transmit the configuration data of the switching point to the service control point, the switching point is arranged to generate and send a configuration message to the control point for indicating the value of at least one parameter which belongs to the configuration data, and the control point is arranged to receive the configuration message. The invention further relates to an intelligent network service control point and a switching point, which can be utilized in the arrangement of the invention. The invention further relates to a method which can be utilized in the arrangement of the invention.

18 Claims, 3 Drawing Sheets

INTELLIGENT NETWORK SWITCHING POINT AND CONTROL POINT

BACKGROUND OF THE INVENTION

The invention relates to transmitting data in a telecommunications system utilizing an intelligent network, and particularly to transmitting data associated with an intelligent network switching point.

A subscriber in a telecommunications network—in a wired network or a mobile telephone network, for example—can be provided with a great number of different services by an intelligent network IN. Such services include a private numbering plan PNP which enables private numbers to be used, and a personal number PN in which the intelligent network reroutes the calls made to the personal number in a manner controlled by the subscriber. An example of such an intelligent network is described in the recommendations of the Q-1200 series of the International Telecommunications Union ITU-T. The invention and its background are described using the CoreINAP terminology of the ETS 300 374-1 standard, but the invention can also be used in intelligent networks implemented by other intelligent network standards.

Figure 1:
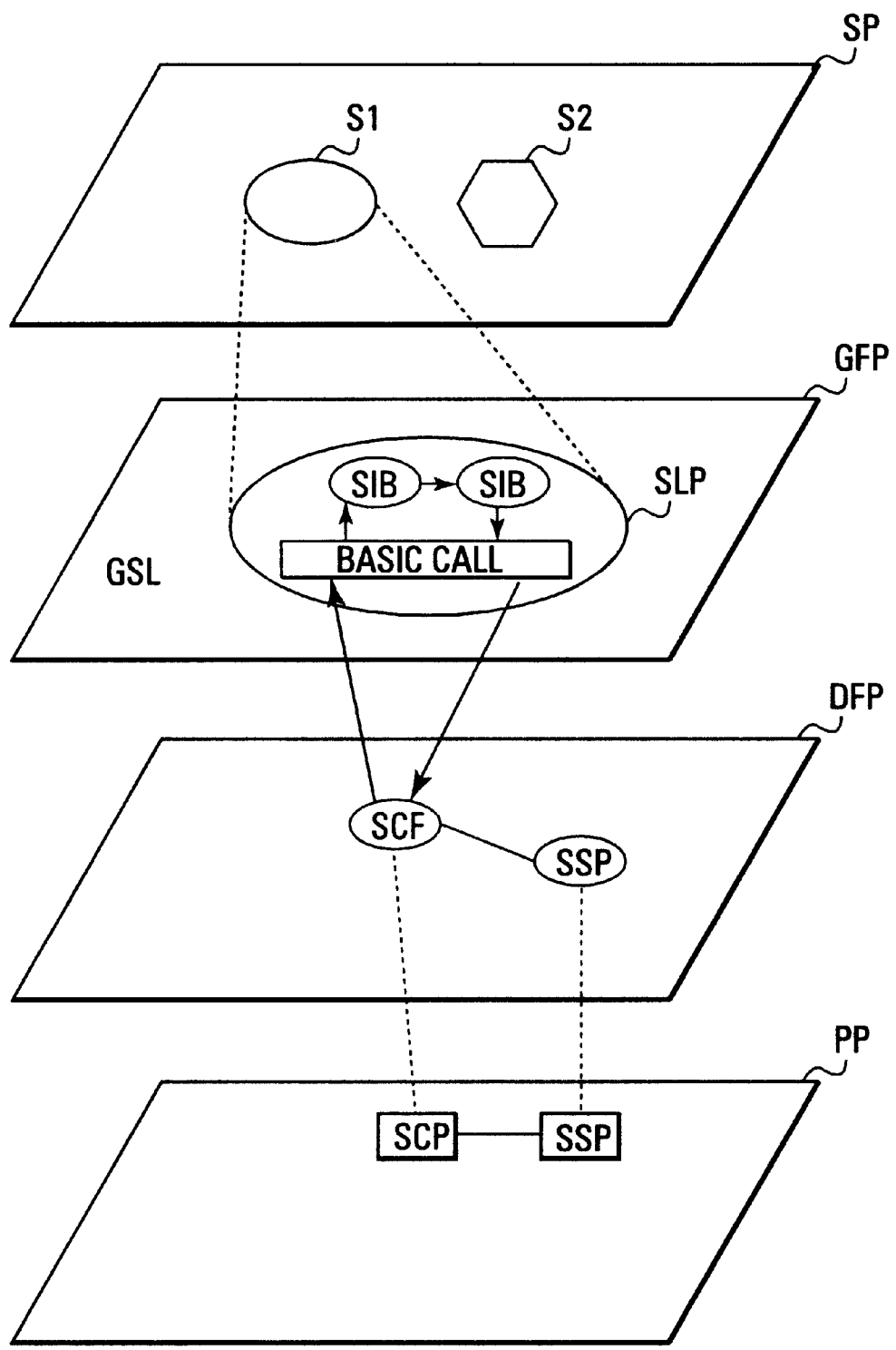

Intelligent network architecture can be described on four functional planes which are determined in the conceptual model of the intelligent network. FIG. 1 shows an extremely simplified example of the functional planes. The top plane is a service plane SP which describes the requirements of each service S1, S2 and their separate capabilities independently of implementation and network technology. A global general functional plane GFP is located below the service plane, in which general service logic GSL defines the processing of each service by means of flow diagrams. These flow diagrams comprise service-independent building blocks SIBs which can be, for example, call processing requests made to a switching centre, database interrogations or data processing performed by a service control function SCF. These flow diagrams can be converted into service logic programs SLPs which are invoked when an intelligent network service is required in a call. As a result of the invoking of the program a unique service logic instance is created for the call. A distributed functional plane DFP in which the functional entities of the intelligent network and the protocols between them are described is located below the global functional plane. The functional entities include a service control function SCF and a service switching function SSF. Each functional entity can perform a number of specified procedures which are called functional entity actions FEAs and which can be used in different services. The SIBs are implemented by using the FEAs. The lowest plane is a physical plane PP which describes how the functional entities are placed in the actual network elements. The CS-1 architecture does not determine how the functional entities identified by it should be placed in the physical network elements. The placement is highly dependent on the hardware manufacturer. Usually, the element in which the service control function SCF is placed is called a service control point SCP and the element in which the service switching function is placed a service switching point SSP.

A basic call state model BCSM defined in connection with the intelligent network describes the different phases of call control and comprises the points in which the call control can be interrupted in order to activate an intelligent network service. It identifies the detection points in the call and connection process in which the service logic instances of the intelligent network can interact with basic call and connection control capabilities. In intelligent networks, connection arrangements and service control are separated from each other so as to make all intelligent network capabilities independent of the switching arrangements. When a call which involves an intelligent network service is set up in a switching centre, the service switching point SSP is responsible for the connection arrangements. The intelligent network service is provided in such a manner that in connection with an encounter of the detection points associated with the services, the service switching point SSP requests the service control point SCP for instructions. The creation, management and performance of intelligent network services are usually centralized to the SCP. In connection with the intelligent network service, a service logic program SLP whose function determines the instructions which the SCP transmits to the SSP in each phase of the call, is activated in the service control point SCP. The SSP interprets the instructions received and begins the call control functions required by them.

In connection with the intelligent network, also non call associated NCA signaling is defined between the service control point SCP and the service switching point SSP. By these signaling messages the SCP can check whether it has a relationship to the SSP (Activity Test), the SCP can request the SSP to filter calls which meet certain criteria (Activate Service Filtering) and in addition, the SCP can request the SSP to limit the number of requests concerning a certain service (Call Gap).

A problem presented by the arrangement described above is that the intelligent network service cannot be built to take the configuration of the switching point into account since data on the capabilities, i.e. the configuration, of the service switching point SSP cannot fully be transmitted to the service control point SCP, but default values must be used for the capabilities of the switching point when the service is being built. If the values of the switching point capabilities deviate from the assumed ones, the service does not function.

BRIEF DESCRIPTION OF THE INVENTION

An object of the invention is to solve the above problem related to building a service and provide an arrangement in which an intelligent network service can be built so as to take the configuration of a switching point into account. This object can be achieved by an arrangement characterized in that the switching point is arranged to generate and send a configuration message to the control point for indicating a value of at least one parameter which belongs to the configuration data, and the control point is arranged to receive the configuration message.

The invention further relates to an intelligent network control point which can be utilized in the arrangement of the invention. The intelligent network control point is characterized in that it comprises reception means for receiving a configuration message which indicates the value of at least one parameter which belongs to the configuration data in the switching point.

The invention further relates to an intelligent network switching point which can be utilized in the arrangement of the invention. The intelligent network switching point is characterized in that it comprises message generating means for generating a configuration message which indicates the value of at least one parameter which belongs to the configuration data of the swicthing point, and sending means responsive to the message generating means for sending the configuration message to the control point.

The invention further relates to a method which can be applied to the arrangement of the invention. The method is characterized by transmitting the parameter values of the switching point from the switching point to the intelligent network, maintaining the configuration data of the switching point comprising said parameter values in the intelligent network, and producing each intelligent network service utilizing the configuration data of the switching point in response to the activation of the service in the control point.

The configuration data of the service switching point includes the following data:

- data directly associated with the function of intelligent network services, such as the function of the SSP in case of error in an SSP-SCP interface, the values of the waiting time control of the reception of the operations used in the SSP-SCP interface, the address of the SCP which activates the intelligent network service,
- the differences in function of the service switching point in different telecommunications networks in different situations, such as in the processing of an A subscriber number,
- cooperation of a capability implemented in the service switching point and an intelligent network service, which can vary in different countries and/or different operators,
- the selection data of service numbers and emergency numbers defined in the service switching point,
- network-specific number information, such as different prefixes,
- special prefixes associated with a capability, such as a temporary calling line identification restriction prefix,
- other special information associated with a capability, such as functioning in special cases, and
- data stored in the switching point for the control point SCP.

The invention is based on detecting the problem and on the idea of complementing the non call associated signaling of the intelligent network architecture so as to enable the transmission of the configuration data of the service switching point to be performed by the non call associated signaling. This enables the data depending on the service switching point SSP and affecting the function of the services in the service control point SCP to be taken into account when the general architecture of service programs is being built. Some of this data can be available to the service programs and some of it only to certain service programs. The invention also allows such SIBs which request the SSP for some specific data. An advantage of the invention is thus that building and providing intelligent network services becomes more diverse in such a manner that the local operation of a telephone network can be taken into account in a better way.

The configuration data of the service switching point can be taken into account in the time guard of service logic programs, for example. The service control point requests each service switching point for the length of the time guard for waiting. In accordance with the received length of the time guard for waiting, the service control point sets the service logic program or a corresponding service logic instance, upon the creation of the instance, information on how soon a time guard reset operation (Reset Timer) must be sent to the service switching point. In this manner, the time guards for waiting of different lengths of the service switching points associated with the service control point can be taken into account and the reset operation can be sent to each switching point at a correct time.

The preferred embodiments of the arrangement, switching point, control point and method of the invention are disclosed in the attached dependent claims 2 to 5, 7 to 9, 11 to 14 and 16 to 18.

LIST OF DRAWINGS

Figure 2:
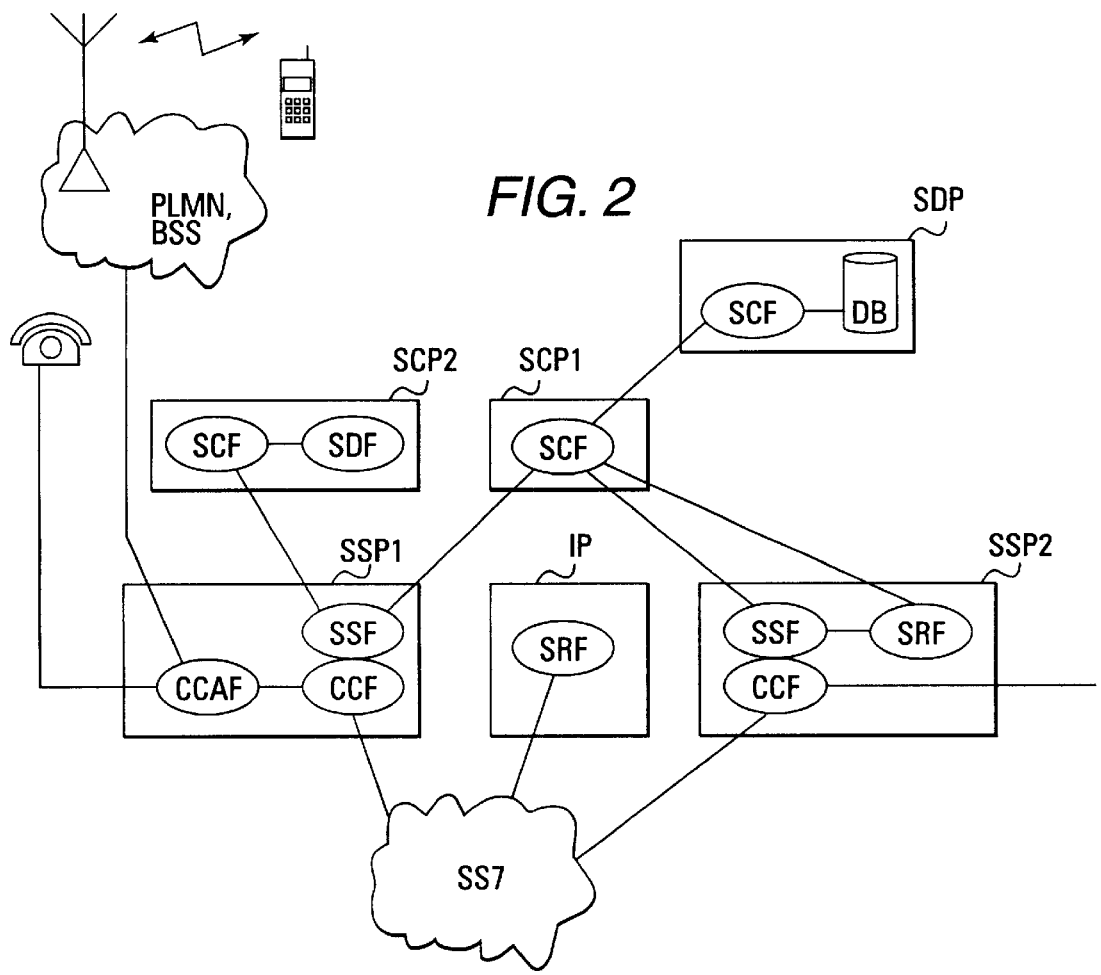
Figure 8:
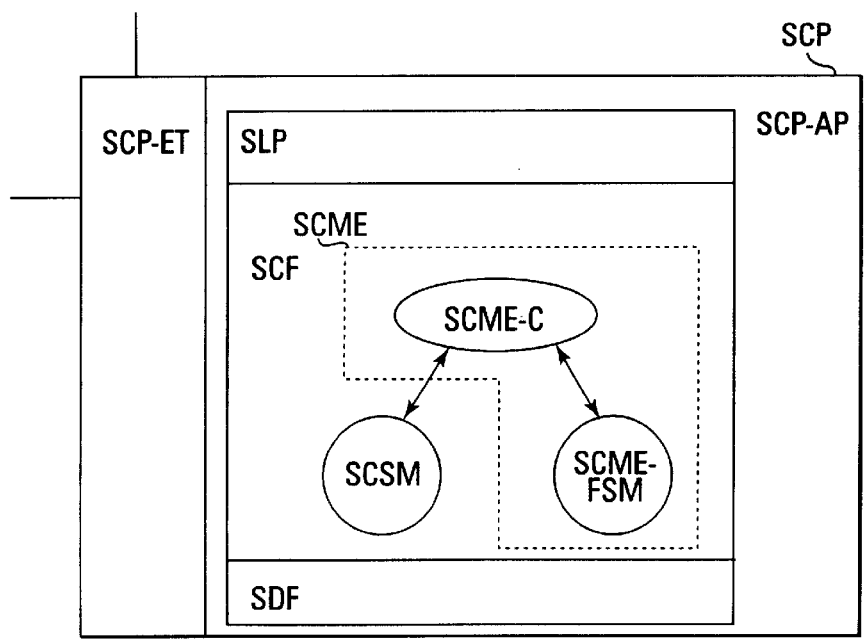
Figure 5:
Figure 6:
Figure 7:
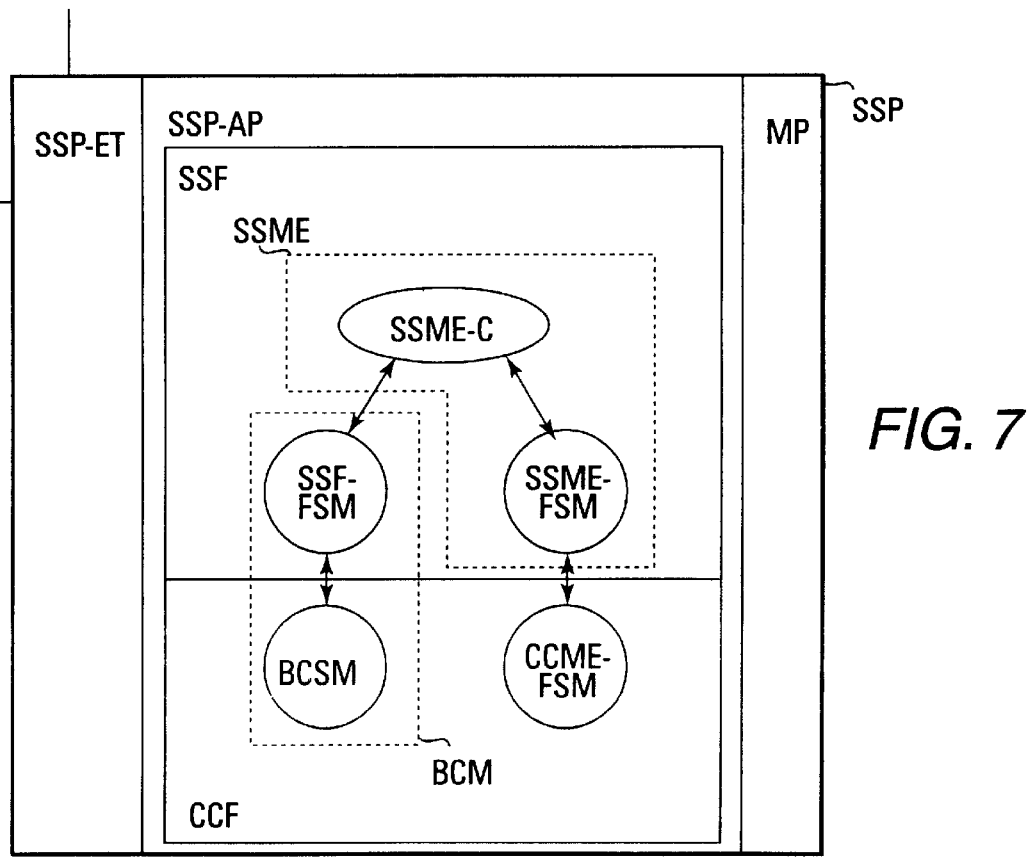

The invention is now described in closer detail in connection with the preferred embodiments with reference to the accompanying drawings, in which FIG. 1 shows the functional planes of intelligent network architecture, FIG. 2 illustrates a telecommunications system utilizing an intelligent network, FIGS. 3, 4, 5 and 6 show the signaling of a first preferred embodiment of the invention, FIG. 7 illustrates an intelligent network switching point of the invention, and FIG. 8 illustrates an intelligent network control point of the invention.

DETAILED DESCRIPTION OF THE INVENTION

FIG. 2 shows a telecommunications system utilizing an intelligent network. FIG. 2 shows elements and functions relevant for intelligent network services. Network elements comprising a service switching function SSF and a call control function CCF are called service switching points. The call control function CCF is not a function associated with the intelligent network but a standard function in switching centres, which comprises the high-level call processing functions, such as the transmission connection setup and release. The service switching function SSF is an interface between the call control function CCF and the service control function SCF. The SSF interprets the requests sent by the SCF and transmits them to the CCF which begins the call control functions required by them. Similarly, the call control function CCF uses the SSF in order to request the SCF for instructions. The SSF is fixedly coupled to the CCF, whose interface it is. Hence, each SSF together with the CCF is located in the same switching centre. A service switching point of the invention is described in closer detail in connection with FIG. 7. A first service switching point SSP1 shown in FIG. 2 is a switching centre comprising, in addition to the CCF and the SSF, a call control agent function CCAF providing the users with access to the network. Since the SSP1 comprises the CCAF, it can be a local switching centre of a fixed network or a mobile switching centre controlling the base station subsystem BSS of a mobile telephone network PLMN, for example. A user terminal can thus be a telephone, a private branch exchange with its telephones or a mobile station with supporting equipment, communicating over an air interface. In addition to the service switching function SSF and the call control function CCF, a second service switching point SSP2 comprises an intelligent network function known as a specialized resource function SRF. The SRF is an interface for the network mechanisms which are associated with the interaction with a subscriber. The SRF can be associated with intelligent peripherals IPs which comprise more sophisticated speech processing functions than the switching centres do.

The network elements which comprise the service control function SCF are called a service control point SCP. The service control function is a centralized authority in the intelligent network including an environment for the execution of service logic programs. Each program can have several instances to perform. A service control point of the invention is described in closer detail in connection with FIG. 8. A first service control point SCP1 shown in FIG. 2 shows a service control point at its simplest since it only comprises the service control function SCF and the required connections. In addition to the service control function SCF, a second service control point SCP2 comprises a service data function SDF. The SDF is a database which is used via the SCF. The service logic programs can request for and update the data in the SDF. For example, service number- or subscriber-specific data can be stored in the SDF. The configuration data of the service control point in accordance with the invention can also be stored in the SDF. The SDF can be a database management system in the service control point SCP or it can be a separate service data point SDP which supports an SCF-SDF interface and comprises a database DB.

Several service switching points SSPs can be connected to one service control point SCP and correspondingly, one service switching point SSP can be connected to several service control points SCPs. Several SCPs can comprise the same service logic program and data or connection to the same data in order to improve network safety and sharing of load.

In some network nodes the service switching point SSP and the service control point SCP are combined. Such a network node is called a service switching and control point SSCP. It comprises the functions of the SSP and the SCP and provides similar services as the corresponding separate points together.

In the telecommunications system of FIG. 2, the network elements are interconnected via a signaling network SS7. Also other networks, such as the ISDN, can be used.

FIGS. 3, 4, 5 and 6 show a signaling in accordance with the invention of a service switching point SSP and a service control point SCP in a first preferred embodiment. In intelligent network technology these signaling messages are called operations. An operation and a message are thus synonyms in the present application. The parameters of a single operation are called operation data in the present specification. A mere parameter means a configuration parameter associated with configuration data or an identifier which identifies the configuration data.

Figure 3:
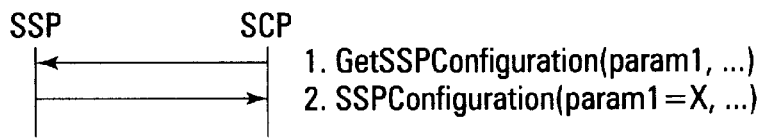

FIG. 3 shows the operations between an intelligent network service control point SCP and an intelligent network service switching point SSP when the control point SCP requests for the configuration of the switching point. In the following, the numbers only refer to the operations of FIG. 3.

1. The intelligent network service control point SCP requests the service switching point SSP for information on its configuration by an enquiry operation (GetSSPConfiguration). In a first preferred embodiment the operation data (param1, . . . ) of the operation are those parameters whose values are to be established. In some other embodiments an operation does not need operation data at all, or the operation data can be an identifier which identifies the default set of parameters or identifies one set from among several default sets. The amount of the requested configuration data is not limited but it can range from data on the value of one parameter to the values of all parameters associated with the configuration data. The service control point can send the enquiry operation at regular intervals or when performing a service fails, for example. The enquiry operation can also be sent when a service logic program is being built or modified. The operation and maintenance functions of the service control point SCP can also command to check certain configuration data of the switching point SSP.

2. The service switching point SSP informs the control point SCP of its configuration by a configuration operation (SSP Configuration). In the first preferred embodiment, the configuration operation comprises as its operation data (param1=X, . . . ) those parameters with their values whose values were requested by the enquiry operation. This ensures that the control point knows which value belongs to a particular parameter. Also mere parameter values can be sent as operation data as long as they are sent in such an order that the service control point is able to assign them to correct parameters. For example, orders according to the enquiry operation or the default set are such orders. Sending mere values decreases the length of the configuration operation and the network load. If the enquiry operation comprises no operation data, the configuration operation comprises the values of all parameters in a certain order with or without their parameters, depending on the application.

When the service control point receives the configuration operation, it compares in the first preferred embodiment the parameter values transmitted in the configuration operation with the stored values and updates the modified values in an SCP database. In this manner, redundant updating work can be avoided. The values are stored as such or appropriately modified. In connection with the comparison it can also be checked whether the new values are acceptable. If not, in the first preferred embodiment the service control point activates the signaling shown in FIG. 5. In other embodiments the control point can update to the database the values of all parameters transmitted in the configuration operation or transmit them either as such or appropriately modified to a service logic program which needs them and to whose implementation the values can be stored.

Figure 4:

FIG. 4 shows the operation between an intelligent network service control point SCP and an intelligent network service switching point SSP when in a first preferred embodiment the value of at least one parameter which belongs to the configuration data of the switching point is modified because the network management updates the network configuration, for example. It is an advantage of this that the configuration data is always update even in the control point. In other embodiments the operation can be sent also at certain intervals, whereupon it comprises the values of all parameters which belong to the configuration data or, for example, the values of the default set parameters formed by the most important parameters either with their parameters or in a certain order. The following number 1 only refers to the operation of FIG. 4.

1. The intelligent network service switching point SSP sends the intelligent network service control point SCP a configuration operation (SSPConfiguration). In the first preferred embodiment the operation data (param1=X, . . . ) comprises the parameter and its modified value from all modified configuration data. Hence, the correct assignment of values can be ensured so as to make the operation as short as possible and avoid transmitting redundant data in the configuration operation. Other operation data can also be used as long as it is ensured that the service control point knows which value belongs to a particular parameter.

After receiving the configuration operation the service control point SCP processes the operation and its operation data updating or transmitting the parameter values as described in connection with FIG. 3.

FIG. 5 shows the operations between a an intelligent network service control point SCP and an intelligent network service switching point SSP when the control point wants to modify the configuration data of the switching point on account of a failed service, for example, or a command received elsewhere from the intelligent network to modify the configuration of the switching point SSP. It is an advantage of this that the configuration of the service switching point can be optimized with respect to the intelligent network service. These operations can be directed to a single call, whereby the configuration of the switching point is different for different calls although they used the same service program. It is an advantage of this, in turn, that the operator has an increasingly varied range of alternatives for providing the customers with customized intelligent network services. The following numbers only refer to the operations of FIG. 5.

1. The service control point SCP sends the service switching point SSP a parameter modification operation (Modify SSPConfiguration). In a first preferred embodiment the operation data (param1=Y, . . . ) only comprises the parameters to be modified with their new values. After receiving the modification operation the service switching point SSP sets for each parameter to be modified a new value indicated in the modification operation. If the modification operation attempts to modify such parameters whose values the switching point is not allowed to or is not able to modify, or if the new value is "impossible" for the switching point, the switching point skips these parameters and keeps their old values. In other embodiments the switching point can, for example, check before setting the values whether the values of the parameters contained in the operation data can be modified to new values, and if so, the values are set. If not, all values remain unmodified.

2. After setting the values the service switching point SSP acknowledges the modifications made by sending a configuration operation (SSPConfiguration) to the service control point SCP. In the first preferred embodiment the operation data (param1=Y, . . . ) comprises the same parameters as the modification operation and their values after the setting. The acknowledgement of the modification command results in the advantage that the service control point knows whether the modification was successful. When the acknowledgement operation of the modification command comprises the parameters with their values, the service control point knows those parameters whose values have been modified and the parameters whose values have remained unmodified. The acknowledgement operation could also be a simple operation comprising no operation data and indicating a failure or a success. In order to indicate the parameter values it is sufficient to inform whether the modification was successful or not. In the first preferred embodiment the service control point does not store or forward the modified parameter values to the service logic program until it has received the configuration operation as an acknowledgement.

If the signaling shown in points 1 and 2 is directed to a single call, the values are not permanently stored anywhere but they are stored in an instance or instances responsible for the call. When the modification is acknowledged by the configuration operation in the single call, the service control point SCP knows whether the service switching point SSP performs as desired in connection with this call.

FIG. 6 shows the operations between an intelligent network service control point SCP and an intelligent network service switching point SSP when, for example, the network management suggests new values for the parameters of the service switching point and the switching point SSP wants to be assured that the suggested modifications do not cause problems to the services. The following numbers only refer to the operations of FIG. 6.

1. The service switching point SSP sends the service control point SCP a configuration operation (SuggestedSSPConfiguration) by which it requests for a permission to modify its configuration to correspond to the operation data. In a first preferred embodiment the operation data (param1=Z, . . . ) with its new values only comprises those parameters whose values are to be modified. In other embodiments alternatives mentioned in connection with FIG. 4 can be used.

In the first preferred embodiment the service control point SCP identifies the configuration operation to be requesting for a modification permission because the operation is named differently. In another embodiment the operation data can start with a question mark, the parameter values can end with a question mark, or it is expressed in some other way whether the configuration message in question only informs of the parameter values or requests for a modification permission.

After receiving and identifying the operation requesting for the modification permission, the service control point examines the operation data parameter by parameter in the first preferred embodiment and compares the value given to the parameter in the configuration operation with the value allowed/appropriate for the parameter and either gives a modification permission or suggests another value for the parameter.

2. In the first preferred embodiment, after checking all parameters the service control point SCP sends the service switching point SSP an operation comprising an acceptable configuration (AcceptedSSPConfiguration). If all modifications of the service switching point were given the modification permission, the service control point further processes the new values of the parameters as described in connection with FIG. 3, for example, without waiting for the acknowledgement of the modifications. The service control point does not wait for the modifications to be acknowledged even when no modification permission was given. In other cases the service control point does not store new values for the parameters until it has received the acknowledgement. It is an advantage of this procedure-that unnecessary signaling in the network is reduced and requesting simultaneously for several parameter modification permissions is allowed in such a manner that one impossible value allows the value modifications of other requested parameters. In some other embodiments the control point can send either an operation giving a modification permission or an operation denying modifications with no operation data.

In the first preferred embodiment the service switching point sets new values for those parameters whose modification suggestion was accepted. If parameters whose modification suggestion was not accepted were involved the service switching point SSP sends the service control point SCP a configuration operation (not shown in FIG. 6) in accordance with FIG. 4. This configuration operation comprises as its operation data the parameters with their values modified by the switching point SSP. After receiving this message the service control point further processes the new values of the parameters. This ensures that the values are the same in the switching point and in the control point.

In other preferred embodiments the switching point does not necessarily acknowledge the modifications it has made at all.

The signaling shown in FIG. 6 can also be used for the service switching point SSP to request the service control point SCP for a set value for a certain parameter. In the first preferred embodiment this is indicated by sending mere parameters with no values in an operation 1 requesting for a modification permission. The service control point SCP then retrieves the recommendable values for the parameters from a database and sends them in an operation 2 comprising the acceptable configuration.

In other preferred embodiments the operations shown in FIGS. 3, 4, 5 and 6 can freely be combined and a set of operations which is most appropriate for each embodiment can be chosen from among them. The only requirement for the function in accordance with the invention is that at least one signaling shown in FIGS. 3, 4, 5 and 6 is used in the embodiments. Each signaling shown in FIGS. 3, 4, 5 and 6 can be performed independently of the other signalings and the signalings can be combined. The operations can be named differently from the ones described above but the data transmitted by them remains unchanged. The operations can also comprise more data than disclosed in the present specification. All operations can also be performed to a single call although this is not mentioned in connection with FIGS. 3, 4 and 6.

FIG. 7 illustrates a service switching point SSP and its functions relevant for the invention. The SSP can be implemented in common switching centres as long as it is ensured that the switching centre separates a basic call control from an intelligent network service control. The service switching point SSP comprises an exchange terminal SSP-ET for receiving signaling from other network nodes and sending signaling to other network nodes, an application part SSP-AP controlling the exchange terminal and a memory part MP. The application part SSP-AP comprises the actual functions of the switching centre, i.e. a service switching function SSF and a service control function CCF and possibly also a CCAF, depending on the type of the exchange. These functions are described in closer detail in connection with FIG. 2. The memory part MP comprises at least the configuration data of the service switching point SSP. The memory part MP can also be located separately and even distributed as long as the application part SSP-AP has a connection to it. Depending on the embodiment and the specifications, even the visitor location register and the home location register of a mobile communication network PLMN can be included in the memory part MP of the service switching point, whereby the configuration data can be located even in the database of the home location register.

The application part SSP-AP comprises a basic call manager BCM which serves to control the basic call and the connection for establishing communication paths for users and interconnects these paths. The BCM detects the events which can lead to the invocation of an intelligent network service or which should be reported to an active intelligent network service logic instance. The basic call management BCM comprises a unique state model instance BCSM for each call. The BCM further comprises interface instances SSF-FSMs (finite state model instances). When an intelligent network service is needed, an SSF-FSM which passes call processing instructions between the BSCM and the SCP is created for the call. When performing the intelligent network service is completed, the SSF-FSM is terminated. The same state model instance BCSM may need a new intelligent network service in another call setup phase, whereupon a new interface instance SSF-FSM is created for it. The interface instances SSF-FSM associated with different calls can exist concurrently and asynchronously.

The application part SSP-AP comprises a service switching management entity SSME for performing the operations received from the intelligent network service control point, replying to them and requesting for instructions. The service switching management entity SSME comprises an SSME control SSME-C and a necessary number of SSME finite state model instances SSME-FSMs. The SSME-C maintains a dialogue with the other parts of the switching point and with the other intelligent network nodes or functions, such as the service control point, for all instances SSF-FSMs and SSME-FSMs associated with the intelligent network services. It is responsible for the creation, invocation and maintenance of the interface instances SSF-FSMs. The SSME-C separates from each other the operations associated with a single call and the non call associated NCA operations and guides the operation received to a correct instance and, if necessary, creates the instance. The management instance SSME-FSM is responsible for the NCA procedures. It performs the procedures according to the operation received and, if necessary, composes an acknowledgement operation or a reply operation.

In a first preferred embodiment of the invention, a unique management model is needed for each signaling shown in FIGS. 3, 4, 5 and 6, by using which management model the SSME-C creates a corresponding management instance SSME-FSM which performs the intelligent network service point procedures described in connection with the corresponding FIGS. 3, 4, 5 or 6. In addition, depending on what the configuration data modified by the signaling of FIG. 5 affects or where it is stored, a totally new management model can be necessary in the first preferred embodiment, by means of which corresponding call control management entity finite state models CCME-FSMs are created whose procedures are assigned to the basic call configuration data or to the configuration of a switching centre which is not associated with the intelligent network. Either the SSME-C or the SSME-FSM can be responsible for the creation of the CCME-FSM.

In the other embodiments of the invention only the models are necessary which are required by the signaling of the embodiment. In the embodiments in which the signaling of the invention is used call-specifically a unique interface model for each call-specific signaling is needed, and the SSME-C creates a corresponding interface instance SSF-FSM by using the model. Alternatively, the interface instance can be created by combining the interface models.

FIG. 8 illustrates a service control point SCP and its functions relevant for the invention. The SCP comprises service logic programs SLPs used in providing intelligent network services and described above in connection with FIG. 1, and a service control function SCF and necessary data SDF or a connection to a separate data point (not shown in FIG. 8) described in connection with FIG. 2. The configuration data of the intelligent network switching point is stored either in the SDF, the SDP or the service logic program, depending on the structure of the control point and how the configuration data is used.

The service control point SCP comprises at least a terminal part SCP-EP for receiving signaling from and sending to other network nodes and an application part SCP-AP which controls the terminal part and at least one service logic program SLP.

The application part SCP-AP comprises SCF call state model instances SCMSs. Each intelligent network service request results in the creation of a call instance SCSM in accordance with the service logic program. The SCSM maintains a dialogue with the SSF, the SDF and the SRF for the service logic program of the intelligent network concerning the service of the particular call which caused the call instance SCSM to be created. The call instances SCSMs associated with different calls can exist concurrently and asynchronously. The application part SCP-AP further comprises a service control management entity SCME for performing the operations received from the intelligent network service switching point and for sending instructions. The management entity SCME comprises an SCME control SMCE-C and a necessary number of management instances SCME-FSMs. In a centralized manner the SCME-C is responsible for the dialogue of all instances SCSMs and SCME-FSMs associated with the intelligent network services with the other parts of the control point and with the other intelligent network nodes or functions, such as the service switching point. It is responsible for the creation, invocation and maintenance of the call instances SCSMs. The SSME-C separates from each other the activities which are associated with the call and the non call associated NCA activities and guides the operation received to a correct instance and, if necessary, creates the instance. The management instance SSME-FSM is responsible for the NCA procedures. It performs the procedures according to the operation received and, if necessary, compiles an acknowledgement operation or a reply operation. In a first preferred embodiment of the invention a unique management model is needed for each signaling shown in FIGS. 3, 4, 5 and 6, and by using the management model the SCME-C creates a corresponding management instance SCME-FSM which performs the procedures of the intelligent network service point according to the description of the corresponding figure.

In the other embodiments of the invention only the models which are required by the signaling of the embodiment are necessary. In the embodiments in which the signaling of the invention is used call-specifically, a unique service logic program is needed for each signaling, and the control SSME-C creates a corresponding call instance SCSM. Alternatively, the call instance can be created by combining service logic programs.

It is to be understood that the above description and the accompanying figures are only intended to illustrate the present invention. It will be obvious to those skilled in the art that the invention can be varied and modified in many ways without departing from the scope and spirit of the invention disclosed in the attached claims.

What is claimed is:

1. An arrangement for transmitting data in a telecommunications system utilizing an intelligent network, comprising:
   at least one intelligent network service control point for providing intelligent network services; and
   at least one intelligent network service switching point for providing a connection between the telecommunications system and the intelligent network services, wherein the switching point is arranged to generate and send a configuration message to the control point for indicating a value of at least one parameter which belongs to a configuration data of the switching point; and the control point is arranged to receive the configuration message.

2. The arrangement of claim 1, wherein the control point is arranged to generate and send a configuration enquiry message to the switching point for finding out the value of at least one parameter which belongs to the configuration data of the switching point; and
   the switching point is arranged to send the configuration message in response to the reception of the enquiry message.

3. The arrangement of claim 2, wherein the enquiry message indicates the parameters whose values are to be found out; and
   the switching point is arranged to receive the enquiry message, to identify the parameters indicated by the enquiry message and to include the values of said parameters in the configuration message.

4. The arrangement of claim 1, wherein the switching point is arranged to send the configuration message in response to a modification of the value of the parameter which belongs to the configuration data of the switching point.

5. The arrangement of claim 1, wherein the control point is arranged to generate and send a configuration modification message to the switching point for modifying the value of at least one parameter which belongs to the configuration data of the switching point; and
   the switching point is arranged to receive the modification message, to set for each parameter included in the modification message the value indicated in the modification message and to send the configuration message in response to the setting.

6. An intelligent network service control point, comprising:
   a connection to a service switching point; and
   reception means for receiving a configuration message which indicates the value of at least one parameter which belongs to configuration data of the switching point.

7. The intelligent network service control point of claim 6, further comprising:
   message generating means for generating an enquiry message which requests the switching point for the configuration message; and
   sending means for sending the enquiry message.

8. The intelligent network control point of claim 6, further comprising:
   message separating means for separating from each other the configuration message comprising the parameter values and the configuration message requesting for a setting permission, and
   processing means for comparing the value of the configuration message with the acceptable values of the parameter in response to the reception of the requesting configuration message; wherein the message generating means are arranged to generate a permission message in response to the comparison, and the sending means are arranged to send the permission message.

9. The intelligent network control point of claim 6, wherein the message generating means are arranged to generate a modification message for modifying the configuration of the switching point; and the sending means are arranged to send the modification message.

10. An intelligent network service switching point, comprising:
    a connection to an intelligent network control point;
    message generating means for generating a configuration message which indicates the value of at least one parameter which belongs to the configuration data of the switching point; and
    sending means responsive to the message generating means for sending the configuration message to the control point.

11. The service switching point of claim 10, further comprising reception means for receiving enquiry messages requesting for the configuration data of the switching point, wherein the message generating means are arranged to indicate the parameter values requested in the enquiry message.

12. The service switching point of claim 10, wherein the message generating means are responsive to a modification of a parameter value; and the configuration message indicates the modified value.

13. The service switching point of claim 10, further comprising:
   reception means arranged to receive a modification message which modifies a configuration;
   message separating means for separating the modification message from the enquiry message; and
   setting means for setting the value of each parameter indicated in the modification message to correspond to the modification message, wherein the message generating means are responsive to the setting.

14. The service switching point of claim 10, further comprising:
   reception means for receiving a permission message which replies to the configuration message; and
   setting means responsive to the permission message, wherein the configuration message is a requesting one which requests for a permission to modify the parameter value.

15. A method of providing a service in a telecommunications system utilizing an intelligent network and comprising at least one intelligent network service switching point for providing an intelligent network interface and at least one intelligent network service control point for producing and performing intelligent network services, the method comprising:
   transmitting the parameter values of the configuration of the switching point from the switching point to the intelligent network;
   maintaining the configuration data of the switching point comprising said parameter values in the intelligent network; and
   producing each intelligent network service utilizing the configuration data of the switching point in response to the invocation of the service in the control point.

16. The method of claim 15, further comprising updating the configuration data of the switching point maintained in the intelligent network in response to a failure to perform a produced service.

17. The method of claim 15, further comprising:
   transmitting the parameter values of the switching point from the intelligent network to the switching point; and
   updating the parameter values in the switching point to correspond to the transmitted values.

18. The method of claim 17, wherein the parameter values are transmitted and updated call-specifically.

\* \* \* \* \*